May 19, 1970  A. E. ZAINO  3,512,754
BLEEDER PLUG
Filed Aug. 30, 1967
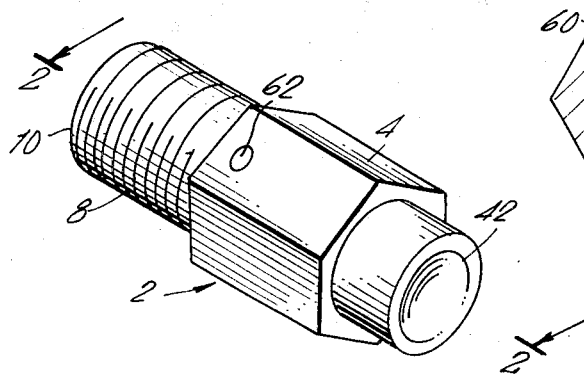
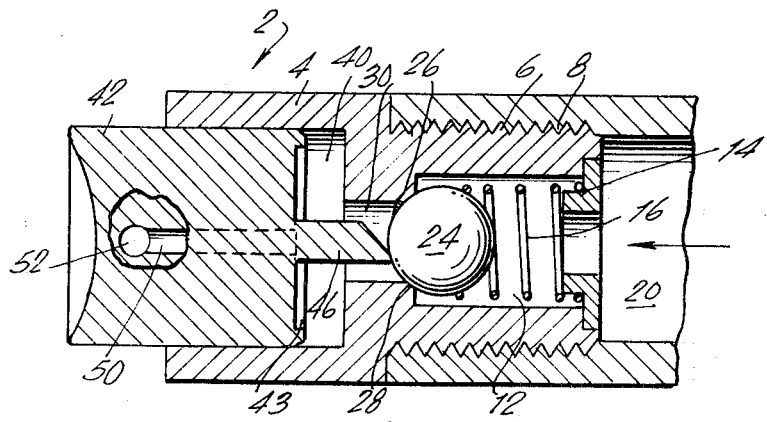
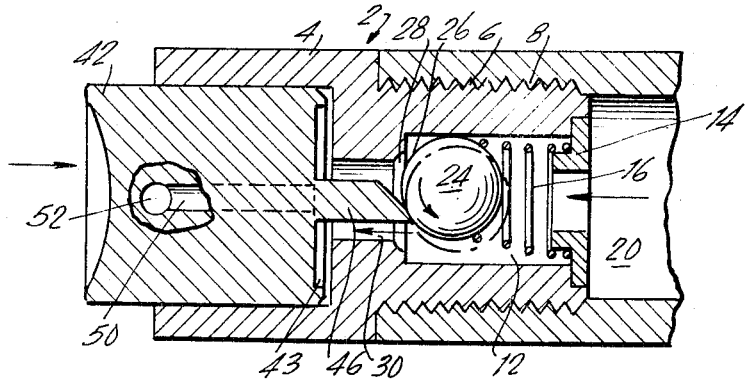
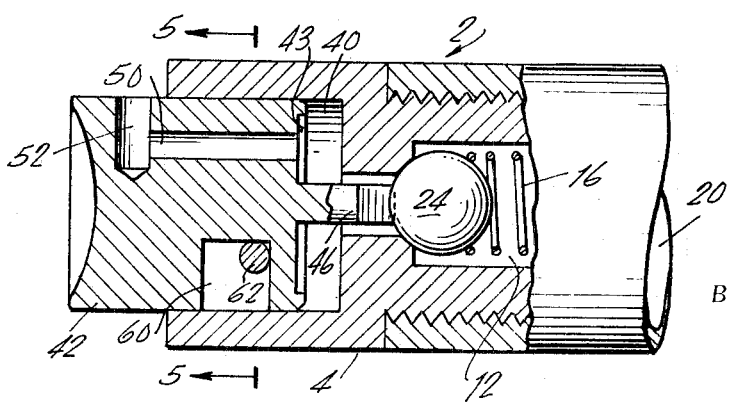
INVENTOR
AURELIO E. ZAINO
BY Friedman & Goodman
ATTORNEYS

United States Patent Office 3,512,754
Patented May 19, 1970

3,512,754
BLEEDER PLUG
Aurelio E. Zaino, 219 Bay 11th St.,
Brooklyn, N.Y. 11231
Filed Aug. 30, 1967, Ser. No. 664,356
Int. Cl. F16k 31/58
U.S. Cl. 251—353                    4 Claims

ABSTRACT OF THE DISCLOSURE

A bleeder plug or relief valve for relieving pressures in a pressure system by bleeding the fluid from the system, the valve including a spring biased ball in a fluid chamber, said valve covering fluid egress, a push button for engaging the ball and depressing it from the egress and a fluid bleeder channel located within the push button.

BACKGROUND OF THE INVENTION

Field of the invention

This invention relates to a fluid pressure relief valve. More particularly, this invention relates to a bleeder plug for withdrawing liquid or other fluid from a pressure system by withdrawing some of the fluid material under the pressure of the system.

Description of the prior art

Several different types of fluid bleeding apparatuses are known. These generaly involve a valve and a separate and distinct bleed line. These prior art bleed apparatuses present normally one notable problem. Because the valve per se is distant from the bleed line exist, use of these valves is a somewhat difficult operation because either too much fluid or too little fluid is withdrawn. This results from the fact that the operator turns the valve off after observing that a certain amount of liquid has exited from the system. When the valve is shut, however, there is additional fluid in the bleeder line itself. This means that in the fluid pressure system, there is less fluid present than desired. This causes a decrease in the pressure on the point in the system where the pressure is desired necessitating increasing the temperature of the system, adding more pressure or reintroducing additional pressure fluid, e.g. hydraulic fluid. Obviously, this is undesirable.

Many bleeder valves suffer from an additional disadvantage in that the actual closing of the system after the proper amount of fluid has been withdrawn takes a substantial period of time, enough so that too much fluid escapes. Such is the case, for instance, in bleeder valves which screw up and down into the bleeder line. Other bleeder valves also are difficult to use because the closing of the valve cannot be closely coordinated with the removal of the desired amount of fluid. Hence, it is desirable to provide a bleeder valve wherein the valve and bleeder line are physically closely related and the closing of the bleeder line is responsive in point of time to the operation of the valve closing means.

SUMMARY OF THE INVENTION

Objects of the invention

It is an object of this invention, therefore, to provide a new and unique bleeder valve for pressure systems containing a pressure fluid.

It is another object of this invention, therefore, to provide such a new and unique bleeder valve in which the valve and bleeder line are in close physical proximity.

It is still another object of this invention, therefore, to provide such a new bleeder valve in which the closing of the bleeder line is responsive in point of time to the operation of the valve closing means.

These and other objects and advantages of this invention will become apparent from the following description of the invention, accompanying drawings and appended claims.

STATEMENT OF THE INVENTION

Broadly, this invention contemplates a bleeder valve for adjusting pressures in a pressure system which comprises a spring biased ball in a pressure chamber, said chamber having an exit orifice over which a portion of the circumference of said ball sits, a push button having an end abutting said ball opposite said spring, said push button rideable in a passageway communicating with said exit orifice, said push button including at least one interiorly positioned bleeder line communicating with said passageway.

In a particularly desirable embodiment, this invention contemplates a bleeder valve for relieving pressures in a liquid pressure system which comprises a spring biased ball in a liquid pressure chamber, said chamber having an exit orifice over which a portion of the circumference of said ball sits, a push button having a protruding end member beveled at its point furthest from the main body of the push button, said end abutting said ball opposite said spring, said push button rideable in a cylindrical passageway communicating with said exit orifice, said push button including two interiorly positioned bleeder lines, one of which is in communication with said passageway, and the other is in communication with the first bleeder line and has a greater cross-sectional area than the first bleeder line.

DESCRIPTION OF THE DRAWINGS

This invention can be more readily understood and appreciated when reference is made to the accompanying drawings in which:

FIG. 1 is a perspective view of the bleeder valve of this invention.

FIG. 2 is a sectional view of the bleeder valve taken along the line 2—2 of FIG. 1.

FIG. 3 is a view similar to FIG. 2 showing the valve opened.

FIG. 4 is a view similar to FIGS. 2 and 3 showing the interior bleeder lines in the push button and the entire valve turned.

FIG. 5 is a sectional view of the bleeder valve taken along the line 5—5 of FIG. 4.

DESCRIPTION OF THE PREFERRED EMBODIMENTS

A preferred embodiment of this invention is illustrated in the accompanying drawings in which the bleeder valve is designated by reference numeral 2. It comprises a hexagonal body 4 shown in cross-section in FIG. 5. The body is threaded at 6 at which point it is generally circular in cross section. The threads 6 engage threads 8 which are reciprocally threaded. Threads 8 are on tubular member 10 which is in communication with a pressure system containing either a vacuum or a fluid, e.g. liquid or vapor under pressure. The main portion of this description will refere to the use of this valve as a fluid bleeder valve, it being understood that it can be used as a vacuum relief valve. Within body 4 is a chamber 12 having a circular seat member 14 for holding a coil spring 16. Circular seat member 14 has an opening in the middle thereof so that chamber 12 communicates with the fluid lines of the pressure system via tubular portion 20 of tubular member 10. Coil spring 16 biases a ball 24 which covers a generally circular exit 26. Ball 24 sits in an arcuate seat 28 having an arc substantially the same as that of ball 24. This seat 28 is seen in FIG. 3. An exit passageway 30 is positioned above exit 26.

The upper portion of the bleeder valve is provided with a cylindrical passageway 40 into which fits a push button 42 slideable against the walls of the passageway. Into the base of push button 42 is attached or formed integrally therewith projecting abutting end member 46. This end member in a preferred embodiment of the invention is beveled as seen in FIGS. 2 and 3. Within push button 42 are two interior bleeder lines. The first line 50 runs in the same general direction as the button itself and communicates with passageway 40. The second bleeder line 52 has a greater cross-sectional area than bleeder line 50 and communicates with the atmosphere at one end and with bleeder line 50 at the other end, meeting it and running perpendicular to it.

Another channel 60 is provided within push button 42. Within this channel 60 is pin 62 which enters receiving holes 64 and 66 on the hexagonal body 4. The pin joins the push button 42 to the body 4. Movement of the push button into the cylindrical passageway is permitted by virtue of provision for the channel 60.

Operation of the bleeder valve in a fluid pressure system is really quite simple. The fluid under pressure fills the tubular portion 20 of tubular member 10 and enters chamber 12. The push button 42 is upwards as shown in FIG. 2 with the beveled end of the abutting end member 46 just touching ball 24. Ball 24 is in seat 28. When the pressure is too great and it is desired to bleed some fluid, the push button 42 is pushed. This causes the abutting end member 46 to push spring biased ball 24 downwards opening up exit 26. This enables fluid in chamber 12 to pass through passageway 30 and into a first bleeder line 50. The fluid passes thence into a second bleeder line 52 which communicates with the atmosphere. When sufficient fluid has been removed, pressure on push button 42 is alleviated, permitting the spring pressure of coil spring 16 to push ball 24 back into seat 28 to close exit 26. Additionally, pressure on the ball 24 due to the action of coil spring 16 pushes abutting end member 46 upwards to the start position shown in the cross-sectional view, FIG. 2.

Use of the bleeder line in a vacuum system is similarly simple. When the vacuum in chamber 12 is such as to overcome the pressure caused by coil spring 16 against hole 24, the ball becomes depressed into the position shown in FIG. 3. This lets air enter the lines 52 and 50 and pass through passageway 30 in a direction opposite to that shown by the arrow in the passageway in FIG. 3. The air enters through exit 26 and readjusts the pressure in the system in a semi-automatic manner.

Several specific features of this invention bear separate mention. By providing bleeder line 52 with a greater cross-sectional area than that of bleeder line 50, use of the device in a fluid pressure system does not entail spraying the bleed fluid into the atmosphere. Hence, a neat recoverable stream of hydraulic fluid or the like comes out bleeder line 52.

Additionally, by providing a beveled end to the abutting end member, the ball 24 is caused to spin every time the push button 42 is pushed. This insures that the same point on the ball 24 is not struck every time the bleeder is employed. Thus, the ball does not wear irregularly which could cause a slight unintended exit between the worn surface of the ball 24 and the seat 28. Such a small exit could cause fluid seepage.

It should also be mentioned that the pin 62 functioning as a guide and stop pin within chamber 60 also prevents blow-out of the push button head 42 on excess pressure.

In a still more preferred embodiment, the push button 42 is provided with an annular recess 43 which assures the full passage of fluid from around the abutting end member 46 into the first bleeder line 50.

Thus it can be seen that the intent invention employs the new principle of a self-cleaning seat 28 with controlled passages to give prompt and effective relief on the system or systems to be pumped, bled or depressurized with no change of leakage. The new bleeder valve provides positive shut-off. Additionally, the new bleeder valve incorporates the new concept of automatic push button return, thereby putting the device into a semi-automatic class. Hence, it can be seen that there is an immediate and positive shut-off upon completion of an operation. This is due to the close proximity of the bleeder lines and the valve closing means. Additionally, the device instantaneously recognizes foreign items to be eliminated during operation, such as air, water and miscellaneous chemicals.

The valve also has many and varied applications too numerous to be itemized in this specification. It can be used in any system requiring relief or exit of any gases or liquids or in any system where a vacuum relief valve is desired.

What is claimed is:

1. A bleeder valve for adjusting pressures in a pressure system which comprises a spring biased ball in a pressure chamber, said chamber having an exit orifice over which a portion of the circumference of said ball sits, a push button having an end abutting said ball opposite said spring, said push button rideable in a passageway communicating with said exit orifice, said push button including at least one orifice, said push button comprising two interiorly positioned bleeder lines, one of which is in communication with said passageway, and the other of which is in communication with the first bleeder line and the atmosphere and has a greater cross-sectional area than the first bleeder line and having a protruding end member beveled at its point furthest from the main body of the push button.

2. A bleeder valve for relieving pressures in a fluid pressure system according to claim 1, wherein the second bleeder line runs perpendicular to the first bleeder line.

3. A bleeder valve for adjusting pressures in a pressure system which comprises a spring biased ball in a pressure chamber, said chamber having an exit orifice over which a portion of the circumference of said ball sits, a push button having an end abutting said ball opposite said spring, said push button rideable in a passageway communicating with said exit orifice, said push button comprising two interiorly positioned bleeder lines, one of which is in communication with said passageway and the other of which is in communication with the first bleeder line and the atmosphere and has a greater cross-sectional area than the first bleeder line, said push button having a protruding end member beveled at its point furthest from the main body of the push button said valve having an annular recess provided on the bottom of said push button communicating with said passageway and the first bleeder line.

4. A bleeder valve for relieving pressures in a fluid pressure system according to claim 3, wherein said push button is provided with a chamber on its side to accommodate a pin passing from one side of the body of the valve to the other side, whereby to join said push button to said body and permit movement of said push button independently of said body.

References Cited
UNITED STATES PATENTS

| | | | |
|---|---|---|---|
| 1,720,389 | 7/1929 | Binks | 251—122 |
| 1,829,413 | 1/1932 | Sage | 251—354 XR |
| 2,370,182 | 2/1945 | Morrow et al. | 251—353 XR |
| 2,894,713 | 7/1959 | Savage et al. | 251—354 XR |
| 3,107,691 | 10/1963 | Schwarz | 251—353 XR |
| 3,174,519 | 3/1965 | Pizzurro et al. | 251—353 XR |
| 3,176,887 | 4/1965 | Potopenko et al. | 251—353 XR |
| 3,228,413 | 1/1966 | Stevens | 251—353 XR |

FOREIGN PATENTS

| | | |
|---|---|---|
| 119,366 | 12/1944 | Australia. |
| 539,163 | 2/1956 | Italy. |
| 877,939 | 9/1961 | Great Britain. |

SAMUEL SCOTT, Primary Examiner